March 1, 1966  M. CITROËN  3,237,722
LIFT FOR VARIOUS LOADS, AND MORE PARTICULARLY
FOR MOTOR VEHICLES
Filed Jan. 20, 1964  9 Sheets-Sheet 1

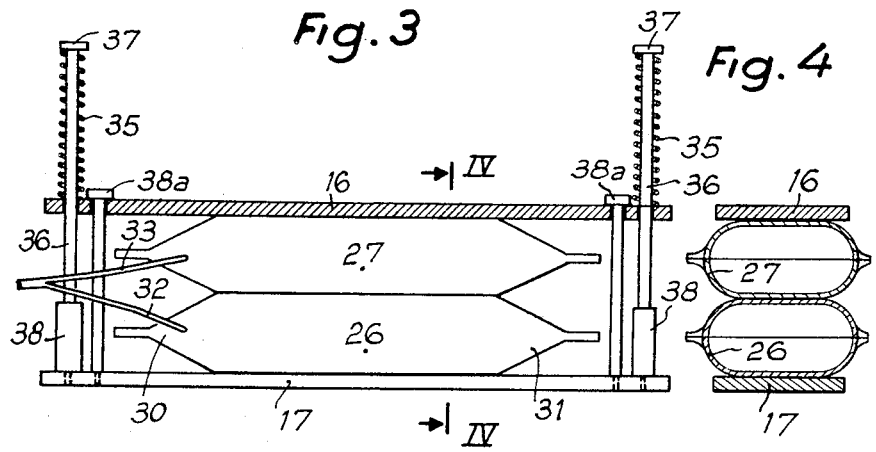
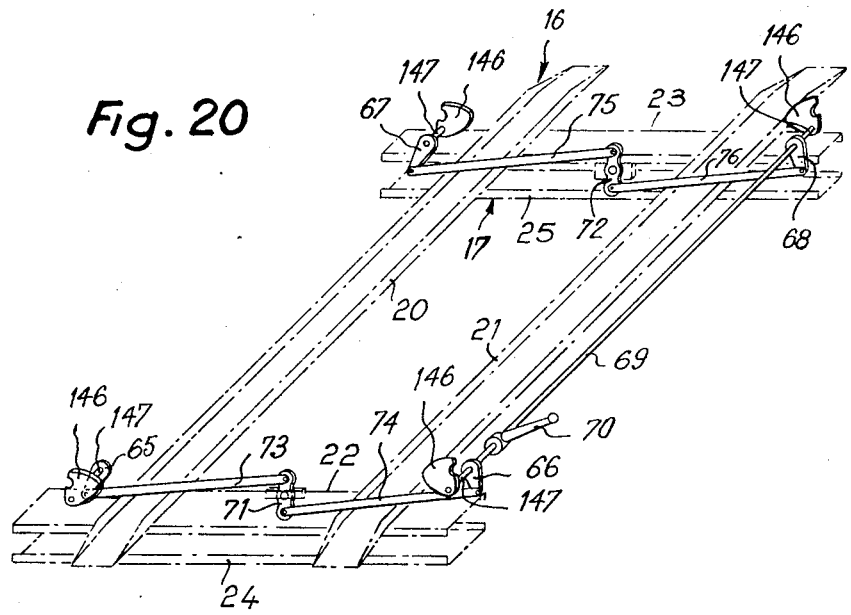

INVENTOR.
MAXIME CITROEN

March 1, 1966 M. CITROËN 3,237,722
LIFT FOR VARIOUS LOADS, AND MORE PARTICULARLY
FOR MOTOR VEHICLES
Filed Jan. 20, 1964 9 Sheets-Sheet 4

March 1, 1966   M. CITROËN   3,237,722
LIFT FOR VARIOUS LOADS, AND MORE PARTICULARLY
FOR MOTOR VEHICLES
Filed Jan. 20, 1964   9 Sheets-Sheet 5
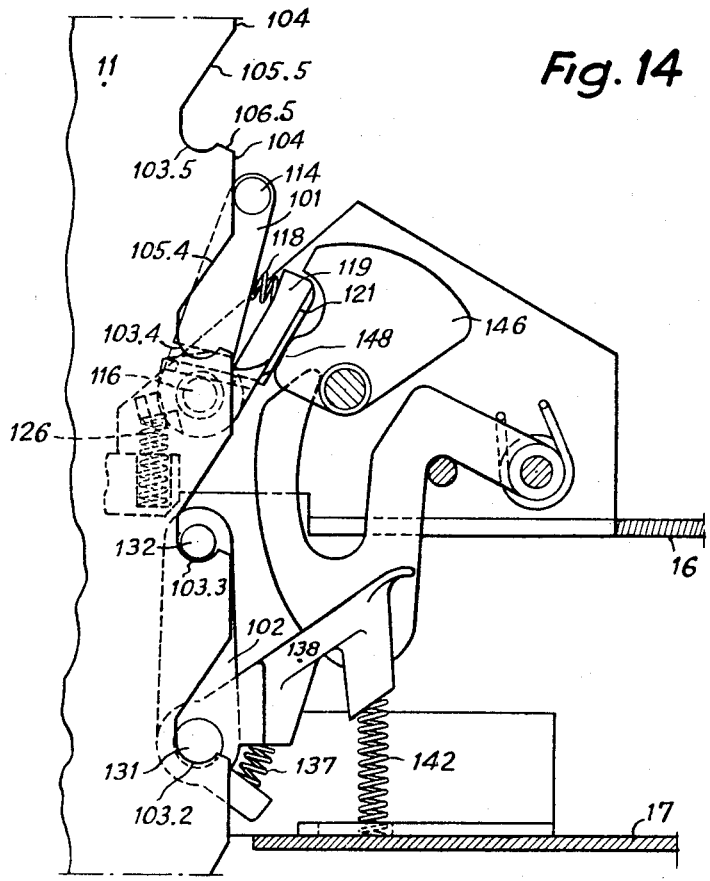
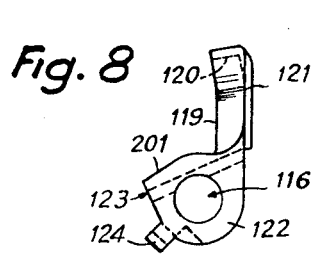
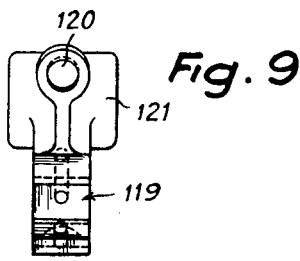

March 1, 1966   M. CITROËN   3,237,722
LIFT FOR VARIOUS LOADS, AND MORE PARTICULARLY
FOR MOTOR VEHICLES
Filed Jan. 20, 1964   9 Sheets-Sheet 6
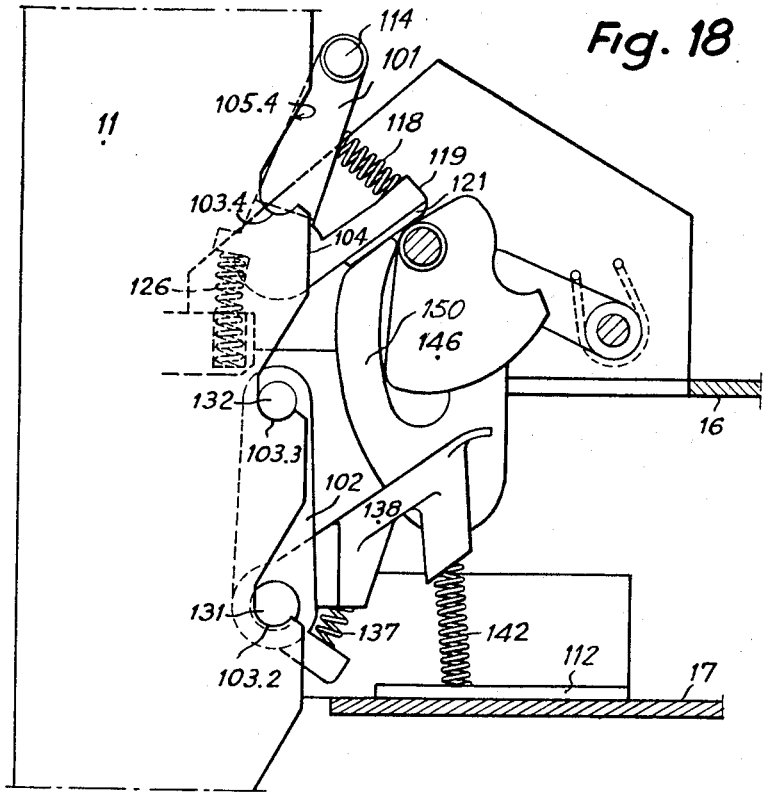
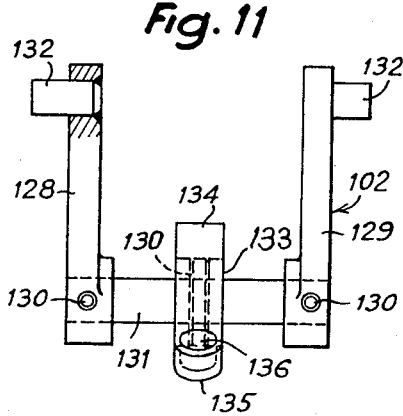
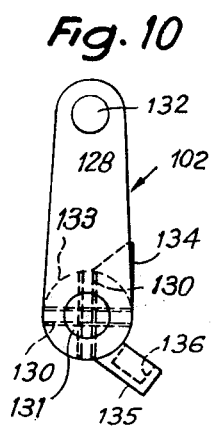

March 1, 1966  M. CITROËN  3,237,722
LIFT FOR VARIOUS LOADS, AND MORE PARTICULARLY
FOR MOTOR VEHICLES
Filed Jan. 20, 1964  9 Sheets-Sheet 7

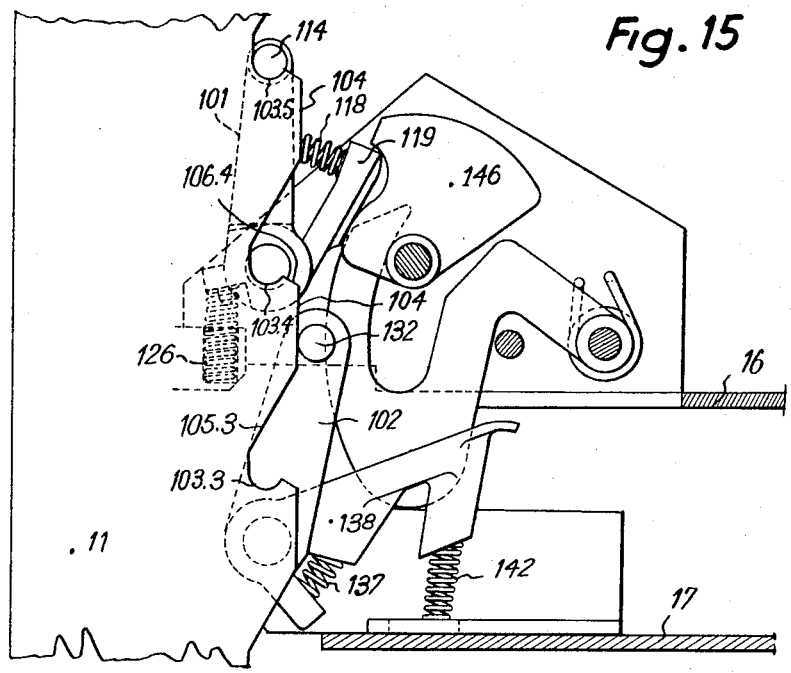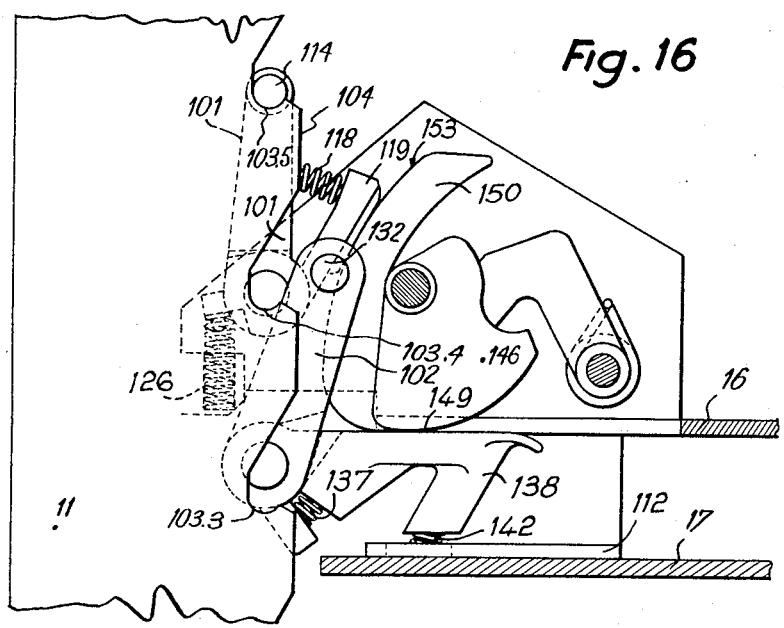

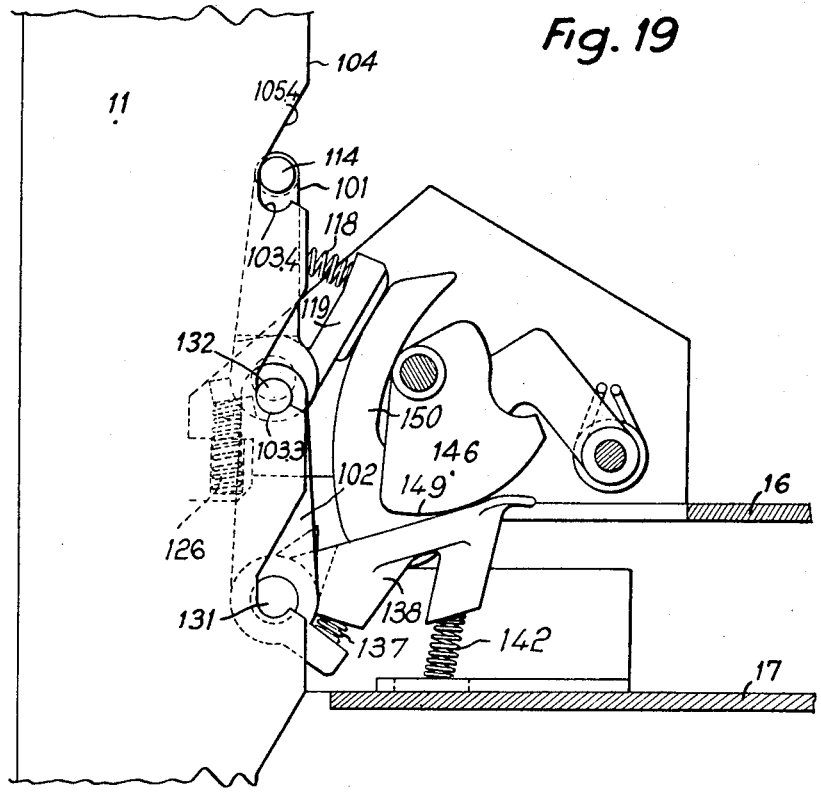

United States Patent Office
3,237,722
Patented Mar. 1, 1966

3,237,722
LIFT FOR VARIOUS LOADS, AND MORE PARTICU-
LARLY FOR MOTOR VEHICLES
Maxime Citroën, 74 Blvd. Maurice Barres,
Neuilly-sur-Seine, France
Filed Jan. 20, 1964, Ser. No. 338,673
Claims priority, application France, Jan. 22, 1963,
922,148
15 Claims. (Cl. 187—8.59)

Numerous lifts, and more particularly lifting platforms, are already known for motor vehicles. Such devices generally comprise a single platform intended to support the load. The platform is guided in a bearer framework comprising posts, uprights, columns or the like, and said single platform is controlled by a drive directly engaging the framework to move the load smoothly over a distance which may be the full lifting limit.

Among the known devices there may initially be mentioned those which comprise cables or chains hooked to the corners of the platform and extending along the corner posts, the cables or chains being wound on guide pulleys or sprocket wheels and being driven by at least one rotary motor and reduction gear unit or a jack.

Systems are also known which comprise at least one hydraulic jack engaging the bearer frame or its base to lift or lower the platform. In a very common construction, the latter is secured at the middle to the hydraulic jack piston rod which then forms a support column.

Irrespective of the drive used, all such known equipment has a large number of disadvantages: the construction is complicated; some of the lifts require a basement, more particularly to house the elements projecting below the bottom lift level; other lifts are too complex, fragile and difficult to control; yet others do not have complete safety in the event of damage of at least one of the parts or a breakdown; finally, other lifts require excessive maintenance.

In addition, known lifting equipment is used in civil engineering to lift heavy loads: slabs, posts etc. Such lifting equipment comprises movable supports guided along vertical elements of the structure which have already been installed, such supports being provided with lugs for locking on the said elements and being controlled by at least one hydraulic jack adapted to transmit a reciprocating pivoting movement which can be split up into successive stages approaching and moving away from the said supports. The load is fixed to one of the latter and the system is so arranged that it can only lift the load step by step. The disadvantage of these systems is that the load cannot be lowered by these means, their operation is not automatic (an operative has to control the system in order continually to correct the position of the load) and the locking lugs seriously damage the guide elements. Consequently, known systems of this type cannot be applied to a motor vehicle lifting platform or a load elevator.

Finally, jacks are known, which are mounted on wheels and comprise a column on which two supports are guided, one of the said supports being intended for the load. These supports are provided with locking lugs co-operating with apertures formed in the column and are connected together by articulated levers adapted to move them apart or bring them close together. Moreover, a reversing element (lift-lower) is intended either to or not to neutralise the springs acting on the lugs. The elevator mechanism of such jacks is obviously not applicable to a motor vehicle lift because, firstly, a plurality would have to be provided distributed around the platform and secondly, it would be very complicated to synchronise their control with safety irrespective of the load distribution.

The present invention obviates the disadvantages of the known devices and provides a lift of new, simple, reliable and economic design.

This lift comprises in known manner two superposed support elements connected to a reciprocating drive which is adapted to bring the two support elements together and move them apart from one another, but it is characterised according to the invention in that:

Firstly, it comprises at least two fixed posts with uniformly distributed points of support, and the top and bottom support elements are respectively provided with a top and bottom set of retaining and locking means registering with each post, such means being retractable and co-operating selectively with the points of support, Secondly, each set of retaining means is controlled by a selective and reversing actuation mechanism, all the mechanisms being controlled by the drive.

According to other important features of the invention, each retaining element is of the suspended type and may be a lever, one of the ends of which has at least one projecting lug, while the other end is pivotally connected to a spindle of the corresponding support element, such spindle extending in parallel relationship to the lug and substantially level with the notches in the post co-operating with the said lug.

Moreover, the relative movement of the two support elements is slightly greater than the spacing of the points of support on the post and is limited by stops, the distance between support elements being at the minimum less than such spacing and at the maximum greater than such spacing. Moreover, centring and locking means are used for horizontally positioning first one and then the other of the two support elements at the beginning of each movement and keep it stationary during the rest of the movement in question.

Furthermore, in a particularly advantageous embodiment, the drive system may comprise firstly a plurality of superposed inflatable tubular envelops interposed between the support elements and extending between two posts, and secondly, counteracting springs.

Moreover, the connection of the two support elements together is such that one has complete freedom of inclination with respect to the other, although within the limit of the travel produced by the drive system.

These various features give the following effects:

The articulated suspension forms a floating assembly of the support elements with respect to the posts, and hence these support elements are perfectly stable irrespective of the distribution of the load on one of them and in addition there is no likelihood of the posts buckling, because they are not subjected to horizontal forces.

The inflatable envelopes enable the top support element to move upwards with complete freedom, without it being necessary to provide a vertical guide, such element in fact being able to assume a certain inclination (non-horizontality) without any adverse effect.

The small distance covered by the support elements with respect to one another as compared with their area, limits the inclination which can occur when the load is not uniformly distributed and renders any such inclination acceptable for the stability of the load on the corresponding support element.

The successive locking of the two support elements at the points of support at the same level on the posts enables first one and then the other of the support elements to be strictly horizontally positioned (without any inclination) during each movement.

According to other features of the invention, each selective and reversing actuation mechanism comprises for each suspension lever two counteracting springs and a relay lever articulated on the same pivot, one of the said springs engaging the corresponding relay lever, which is subjected to a common reversing cam borne by one of the support elements.

In a particularly advantageous embodiment, each actuation mechanism is distinguished in that firstly the disengaging spring for each top suspension lever engages the top support element while the disengaging lever for each bottom suspension lever engages the corresponding relay lever, and secondly, the spring for engaging each top suspension lever engages the correspondingly relay lever while the spring for engaging each bottom suspension lever is interposed between the bottom support element and the associated relay lever, which has a surface for driving the said bottom suspension lever. The reversing cam for this mechanism is borne by the top support element and has two projections intended to register respectively with the top relay lever permanently to lock the same just during the load lifting operation and the bottom relay lever to lock the same periodically during just the load lowering operation. This reversing cam is also associated with a rockable stop borne by the top support element and co-operating with a fixed stop of the bottom support element in order periodically to lock the top relay lever.

These features give numerous advantages. First of all, the component parts of the mechanisms may be manufactured and fitted with a normal precision for this type of equipment because the interactions of the support elements during the lowering of a load are produced by means of springs or a rocking stop, which have the effect of tensioning the suspension elements well before they are used, and because interactions take place at the end of the approach movements of the said elements and never at the end of the movements apart. Moreover, the presence of springs enables the operation to be strictly controlled without its geometry itself being strictly accurate. This is also clearly apparent from the operation of the equipment as described hereinafter. It is now possible to manufacture the mechanisms, supension levers and notches posts economically, and without special accuracy. Moreover, the inflatable envelops may be made and fitted at a price very much below that of jacks or other elements conventionally used. The manufacture of such a lift is therefore much less complicated than that of the known equipment.

Secondly, the lift according to the invention can be used with complete safety firstly because one of the support elements is always suspended from and locked on the posts at any time of operation, whether to lift or lower a load. Then again, since the reversal of the movement of the support elements (moving together/apart) can take place only when all the support element suspension levers previously moved have been engaged and locked in the notches of the posts at the same level. To this latter end, and according to other features of the invention: the relative movement of the two support elements is slightly greater than the spacing of the notches of the posts and is limited by stops disposed on such elements. Moreover, a common distributor controls the periodic emptying and filling of all the inflatable envelopes, such distributor being controlled by a plurality of pneumatic valves connected in series and disposed near the limit stops for the approach movement of the support elements (in order to fill the said envelopes) and by a plurality of pneumatic valves connected in series and disposed near the limit stops for the movement of the support elements away from one another (to empty such envelopes).

Furthermore, when the lift is intended to lift the front or rear of a motor vehicle it comprises two posts and the support elements are then limited to two superposed cross-members extending between the said posts.

On the other hand, when the said lift is intended to lift a load completely, for example a complete motor vehicle, it comprises at least four posts; the top support element is then formed by two U-section rails secured perpendicularly to two cross-members each extending between two posts, while the bottom support element is limited to two cross-members situated beneath the first cross-members, the suspension levers being borne by the ends of the top and bottom cross-members.

Various other features of the invention will be apparent from the following detailed description.

Embodiments of the subject of the invention are shown by way of non-limiting example in the accompanying drawings, wherein:

FIG. 3 is a side elevation of the twin platforms to illustrate one particularly advantageous embodiment of the reciprocating drive controlling the said platforms, the actuating mechanisms and the suspension levers having been omitted in order to simplify the drawing.

FIG. 4 is a section on the line IV—IV in FIG. 3.

FIG. 8 is a front elevation of a top relay lever and FIG. 9 its side elevation.

FIG. 10 is a front elevation of a bottom suspension lever and FIG. 11 its side elevation.

FIGS. 14 and 15 are front elevations being fragmentary views to show in conjunction with FIG. 5 the characteristic stages of the operation of the lift to lift a load.

FIGS. 16 to 19 are similar views to FIGS. 14 and 15 to show the characteristic stages of the operation of the lift to lower a load.

FIG. 20 is a diagrammatic perspective view showing a control system common to the reversing cams.

FIGS. 1 and 2 show that the lift according o the invention comprises firstly a fixed bearer frame formed by vertical posts and secondly two twin elements bearing the load which is to be lifted or lowered, these elements being superposed and subject to the action of a drive to bring them together or move them apart over a relatively small distance.

Figure 1:
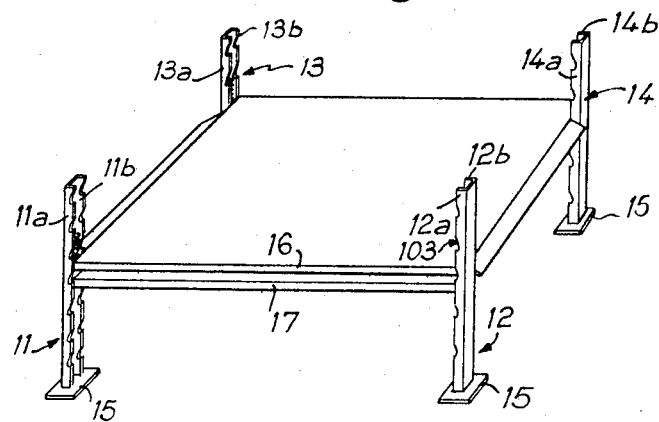
FIG. 1 is a general and diagrammatic perspective view of a lift according to the invention.

In a first embodiment (FIGS. 1 and 2) applicable when the load is to be lifted or lowered completely, the bearer frame is formed by four independent posts 11 to 14, such as U-sections each rigidly connected to a base plate 15 anchored by any appropriate means in the basement. The two support elements can then be in the form of two platforms 16 and 17, the corners of which is register with each post are provided with top and bottom suspension elements 101 and 102 which are retractable and co-operate with notches 103 in the posts. The top platform 16 is intended directly to support the load and is in turn supported either by the posts 11 to 15 when its suspension elements 101 engage the notches 103 of the same level of the said posts, or by the bottom platform 17 and through the agency of the drive system when the suspension elements 102 of the bottom platform engage with the other identical level notches 103 of the posts.

According to a variant (FIG. 20) which is applicable more particularly to a lift platform, the top platform 16 is replaced by two longitudinal rails 20 and 21 of U- section to guide the wheels of a motor vehicle which is required to lift or lower, such rails being connected by any appropriate means to two end cross-members 22 and 23. The bottom platform 17 is reduced in this case—as it could also be in the first embodiment—to two cross-members 24 and 25 disposed beneath the first cross-members.

According to a second embodiment applicable when the load has to be lifted or lowered at one of its ends only, for example the front or rear of a motor vehicle, the bearer frame comprises two posts 11 and 12 between which extend two twin support cross-members, a top one 22 and a bottom one 24. In this case, as in the previous variant, the suspension elements 101 are borne by the ends of the top cross-members 22 (and 23) and the suspension elements 102 by the ends of the bottom cross-members 24 (and 25).

As will be apparent from FIGS. 1, 5 and 14 to 19, the notches 103 which form points of support are regularly distributed over the entire effective height of the posts 11 to 14. For each post and at the same level there are in the embodiment illustrated two notches 103 cut in register with one another in the side flanges of the post, these flanges being denoted by the same reference as the latter but distinguished by the indices a and b. The identical level notches of all the posts are situated in the same horizontal plane. Moreover, the opening of the U-section forming each post extends towards the corresponding suspension elements 101 and 102.

Each notch 103 (FIG. 14) has a substantially semi-circular form. It is connected to the free edge 104 of the corresponding flange of the post, by an ascending ramp 105 and a descending ramp 106 so that it is accessible from outside for the suspension elements 101 and 102.

Finally, the spacing of the notches 103 is constant and relatively small (about 6 to 8 cm.), the relative travel of the support elements 16 and 17 being slightly greater than this spacing (about 2 cm.). This travel of the support elements is limited—see FIGS. 3 and 4—by stops 38 to limit the movement of the support elements towards one another and stops 38a to limit their movement away from another. In the exemplified embodiment illustrated, these stops are rigidly connected to the bottom support element 17 and are disposed respectively beneath and above the top support element 16. However, other relative arrangements may be considered. In every case the said stops 38 and 38a may be distributed in the adjacent zones of the post and drive system.

The reciprocating drive system may be of the pneumatic or hydraulic type. According to a first embodiment illustrated diagrammatically in FIG. 2, this system may comprise four pneumatic or hydraulic jacks 18 of the single-action type with a small stroke, interposed between the two platforms 16 and 17 in order to move them apart, such jacks being associated with counteracting springs 19.

According to a particularly advantageous second embodiment, the jacks 18 are replaced by at least one pneumatically inflatable envelope, which is interposed between the platforms 16 and 17. As will be seen from FIGS. 3 and 4, the reciprocating drive system may comprise between each cross-member 22 or 23 of the top platform 16 and the corresponding cross-member 24 or 25 of the bottom platform 17 a plurality of inflatable tubular envelopes (2 in the example illustrated) 26 and 27 which are superposed and extend over a length, this length depending upon their diameter, the maximum load to be lifted, and the air pressure used. These envelopes are identical however and are formed by a high-strength fabric tube coated with an elastomer, the ends 30 and 31 of the tube being flattened and stuck to form the envelope. The envelopes 26 and 27 may be connected by conduits 32 and 33 to a compressed air storage tank or distributor (not shown). The conduits 32 and 33 lead into the envelopes either near one of their ends 30 and 31 or at any point of their body.

Figure 5:
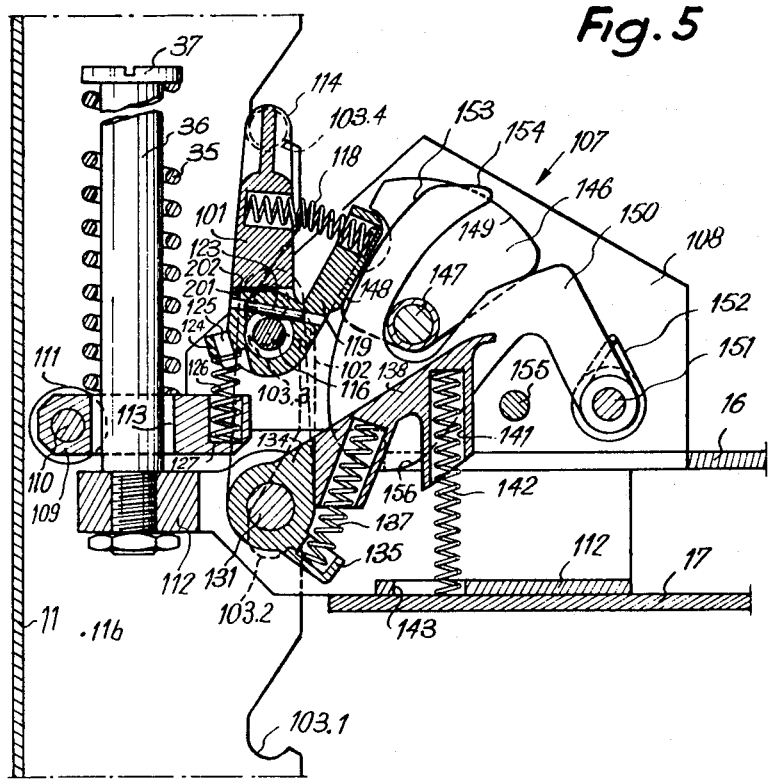
FIG. 5 is a vertical central section showing from the front and to an enlarged scale the means used in register with a post to lift or lower the twin platform assembly (suspension levers, relay levers, notches, reversing cam, rockable stop, fixed stop, etc.).

In addition to the inflatable envelopes 26 and 27, the reciprocating drive system comprises at least one counteracting spring 35 inside each of the U-sections making up the posts 11 to 14. FIGS. 3 to 5 show that the bottom platform 17 is rigidly connected to as many columns 36 as there are springs 35 and that the latter are disposed over the part of the said columns which projects from the top platform 16. Each spring is then interposed between this latter end a top 37 of the corresponding column 36. This arrangement has the advantage that the springs 35 are not situated in the path of a vehicle entering or leaving the platform and that they do not project beneath the bottom platform, since this would necessitate a basement being provided for the lift.

When compressed air is admitted the casings 26 and 27 inflate and tend to move the platforms 16 and 17 apart until the top one 16 is applied against all the stops 38a (FIGS. 3 and 4). On the other hand, when these envelopes are deflated, the action of the springs 35 becomes predominant and causes the platforms to approach one another as the casings flatten. In this position the top platform 16 is applied against the stops 38 of the bottom platform 17 thus preventing any damage to the envelopes by squashing.

Figure 3B:
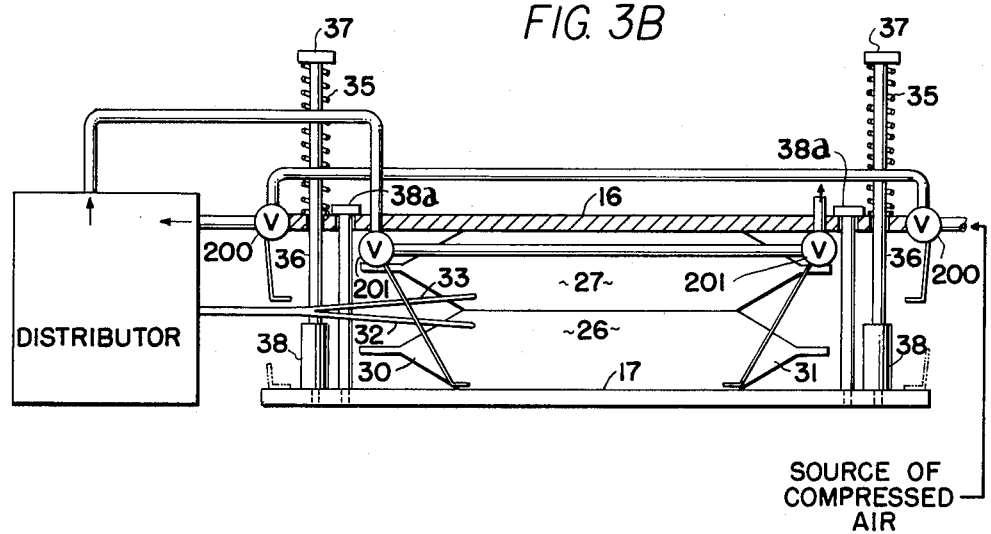
FIG. 3B is a view similar to FIG. 3 illustrating a further modification.
Figure 3A:
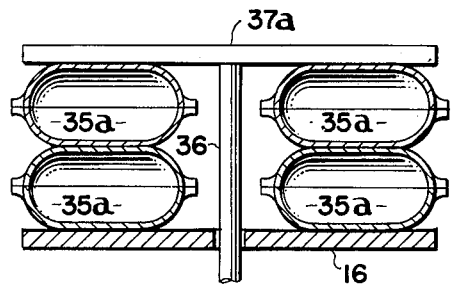
FIG. 3A is a fragmentary view similar to FIG. 3 illustrating a modification.

The return spring or springs 35 may advantageously be replaced by at least one inflatable envelope 35a similar to those already described, as illustrated in FIG. 3A, particularly when it is required to increase the speed at which the platforms approach one another. This gives a reciprocating drive system of the double-acting pneumatic type.

According to a first embodiment illustrated in FIG. 4, the envelopes 26 and 27 may be stuck together. In this case they may communicate with one another through apertures formed in the stuck surfaces.

According to a second embodiment, the envelopes 26 and 27 may be separated by rigid spacer plates guided by columns which may be the columns 36.

The use of a plurality of superposed envelopes has the following advantages over a single envelope: for one and the same travel less compressed air is used and for one and the same air pressure the envelope can be thinner since the radii of curvature are smaller.

The advantages of the inflatable casings are particularly interesting:

They give an appreciable saving as compared with conventional pneumatic jacks.

Perfect sealing-tightness is ensured since there are no joints.

A high lifting force can be obtained with conventional compressed air pressure since the support area is large.

These envelopes provide a system whereby the top support element 16 has great freedom of movement in relation to the bottom support element 17 during the upward movement of the element 16.

Figure 2:
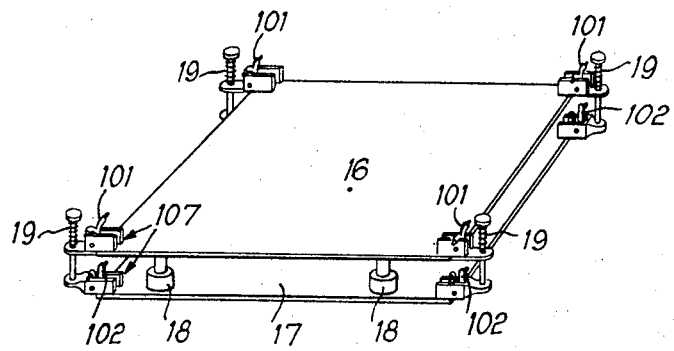
FIG. 2 is a diagrammatic perspective view showing two platforms for the lift together with the main components borne by the platforms.

According to a third embodiment of the drive system, the latter comprises a plurality of hydraulic jacks arranged as illustrated in FIG. 2, associated with counteracting springs 19 and distributed between the support elements 16 and 17 near the posts 11 to 14 and as close as possible to the outward movement limit stops 38a. The device also comprises an oleopneumatic jack or a hydraulic piston pump with a single chamber. This jack is preferably of the pressure multiplying type, i.e., the area of the piston moving in the pneumatic chamber connected to the said compressed air distributor is larger than the area of the piston moving in the hydraulic chamber, these pistons being connected together. Irrespective of the type of oleopneumatic jack or pump used, it should be noted that the swept volume of the hydraulic chamber is equal to the sum of the swept volumes of the operative chambers of the hydraulic jacks distributed amongst the support elements. Thus if one of the latter reaches the end of its travel before the others, the top support element 16 will stop at its location on the corresponding stop 38a but will resume its horizontal position, re-joining the other stops 38a under the action of the other jacks which will continue their travel.

The compressed air storage tank or distributor controlling the periodic filling and emptying of the pneumatic elements formed either by the jacks 18 or by the inflatable envelopes 26 and 27 is controlled firstly by a plurality of pneumatic valves 200, as illustrated in FIG. 3B, connected in series and borne by the top support element 16 near the approach movement limit stops 38, such valves operating the distributor when they are all actuated by the bottom support element 17 so that the distributor connects the said pneumatic elements to the compressed air source and secondly by a plurality of pneumatic valves 201 connected in series and borne by the top support element 16 near the outward movement limit stops 38a, said valve operating the distributor when they are all actuated by the bottom support element 17 so that the distributor connects the pneumatic elements to atmosphere.

The combination of the stops 38 and 38a and of the series-disposed valves is particularly advantageous for the safety of operation of the equipment, since it ensures that the reciprocating movements of the support elements (towards and away from one another) can take place only when such elements have reached the ends of their travel in a perfectly horizontal position.

Each set comprises a top suspension element 101 and a bottom suspension element 102, co-operating with the notches 103 in whichever of the posts 11 to 14 corresponds to these elements, and is subject to a selective and reversing actuation mechanism 107 (FIG. 2). All these mechanisms 107 (four in the example illustrated, two in the case of a lift with two posts) are controlled independently of one another by the drive system.

An embodiment of such a mechanism 107 is shown in detail in FIGS. 5 and 14 to 19. In this embodiment, the top support element 16 is rigidly connected to two cheeks 108 and a member 109 through which passes a spindle 110 on which two rollers 111 are mounted loosely at the end, these rollers registering with the web of the corresponding post, for example 11. These rollers and others situated in opposition to the support element 16 co-operate with the posts 11 and 12 to limit the transverse movement of the said element which is in fact suspended so as to float from the said posts (see hereinbelow). Other rollers may also be provided to limit the movement in a perpendicular direction and to this end they co-operate with the flanges 11a and 11b, 12a and 12b. This is advantageous when the system comprises only two posts.

The bottom support element 17 is rigidly connected to a fork 112 which together with the member 109 penetrates into the post 11. A vertical column 36 is fitted and secured by any means to the fork 112 and passes through an oblong aperture 113 in the member 109. A powerful spring 35 on the column is interposed between a head 37 thereon and the said member 109.

Figure 6:
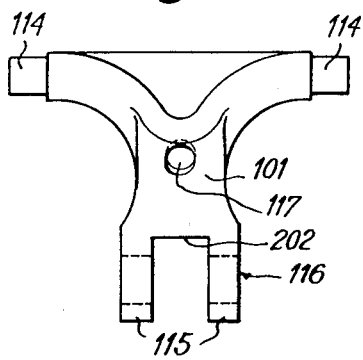
FIG. 6 is a front elevation of a top suspension lever and FIG. 7 its side elevation.
Figure 7:
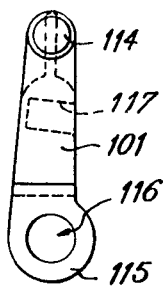
Figure 17:
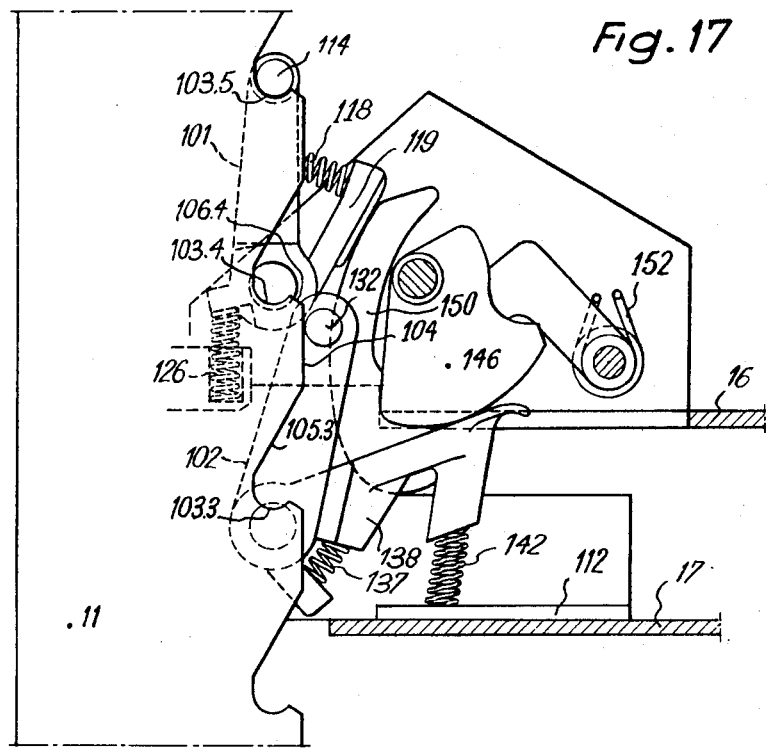

The top suspension element 101 is formed by a lever shown in FIGS. 6 and 7. This lever has:

At its top part: two aligned horizontal projecting lugs 114 intended to co-operate with the notches 103 in the flanges 11a and 11b of the post 11.

At the bottom: a fork 115 mounted loosely on a spindle 116 extending in parallel relationship to the lugs 114 and supported by the cheeks 108.

In its central zone: a recess 117 for one of the ends of a spring 118.

The top suspension lever 101 is associated with a top relay lever 119 which is shown in detail in FIGS. 8 and 9. It has:

At the top: a recess 120 for the other end of the spring 118 and opposite the same a plate 121.

At the bottom: an eyelet 122 to be interposed between the arms of the fork 115 of the suspension lever 101 disposed on the pivot 116 and coupled to the latter by means of a tangential pin 123.

The eyelet 122 also has a projecting radial lug 124 with a projection 125 for centring one of the ends of a spring 126, whose other end engages a recess 127 in the member 109. This eyelet also has a driving surface 201 intended to co-operate with a driven surface 202 formed by the web of the fork 115 of the top suspension lever 101.

The bottom suspension element 102 is formed by a triple lever shown in FIGS. 10 and 11. This lever comprises two parallel arms 128 and 129 fixed at the bottom by any appropriate means, for example pins 130, to a spindle 131 borne by the fork 112. At the top these arms are rigidly connected to aligned horizontal projecting lugs 132 intended to co-operate with the notches 103 in the flanges 11a and 11b of the post 11. The arms 128 and 129 are spaced by an amount such that they can be moved—without any risk of obstruction—between the flanges 11a, 11b and on either side of the cheeks 108 of the top support element 16. The lever 102 also has a third arm 133 fixed by any suitable means, for example a pin 130, to the central part of the pivot 131. The arm 133 has a projecting triangular boss 134 and a radial lug 135 in which is provided a recess 136 for one of the ends of a spring 137.

Figure 12:
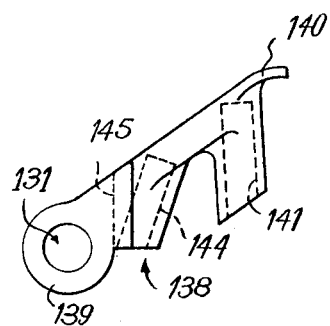
FIG. 12 is a front elevation of a bottom relay lever and FIG. 13 its top view.
Figure 13:
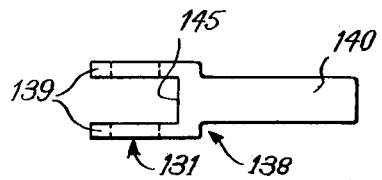

The bottom suspension lever 102 is also associated with a bottom relay lever 138. The latter is shown in detail in FIGS. 12 and 13, and comprises:

At one of its end parts: a fork 139 mounted loosely on the pivot 131 and extending on either side of the arm 133 of the lever 102.

At its other end part: a curved plate 140 situated at the top and a thickening at the bottom bounding a recess 141 for one of the ends of a spring 142 whose other end engages in a slot 143 in the fork 112 of the bottom support element 17.

In its central zone: firstly, a thickened part at the bottom to bound a centring means 144 for the other end of the spring 137 and secondly, a driving surface 145 formed by the web of the fork 139 of the relay lever in question and intended to co-operate with the boss 134 of the corresponding suspension lever.

Apart from the top and bottom suspension levers 101 and 102, the top and bottom relay levers 119 and 138, the top and bottom engagement springs 118 and 142, the top and bottom disengagement springs 126 and 137, each mechanism 107 comprises a reversing cam 146 intended to co-operate selectively with the relay levers 119 and 138. In the embodiment illustrated, this cam is of the pivoting type and to this end is rigidly connected to a spindle 147 mounted rotatably in the cheeks 108 of the top support element 16. It has two projections 148 and 149 offset angularly in relation to one another and separated by recesses for the passage of the elements which are not to be locked. The projection 148 is provided to form a permanent support for the top relay lever 119 when the cam 146 is in the "load lifting" position (FIGS. 5, 14 and 15), in which position the said projection registers with the plate 121 of the relay lever. On the other hand, the projection 149 is provided to form a temporary and periodic support for the bottom relay lever 138 when the cam 146 is in the "load lowering" position (FIGS. 16 to 19), in which position the said projection is situated flush with the plate 140 of this relay lever.

The reversing cam 146 is asociated with a rockable stop 150 shaped substantially like a question mark. At one of its ends this stop is rotatable about a pivot 151 borne by the cheeks 108 of the top element 16 and is subject to the action of a return spring 152, for example of the type used in clothes pegs, which tends to pivot it downwards. The rockable stop 150 has on the one hand a curved ramp 153 concentric with the pivot 151 and enabling the top relay lever 119 to be locked during the "load lowering" stage in the same operative position (FIG. 16) as it occupies when it is locked by the cam 146 during the "load lifting" stage (FIG. 5). The rockable stop 150 also has a stop lug 154 which when the stop is in the bottom position and is applied against a stop 155 of the top element 16, locks the top relay lever in a neutralisation position (FIG. 18). The rockable stop 150 finally has a curved edge 156 co-operating with a fixed stop of the bottom support element 17. In the example illustrated, the rockable stop 150 is disposed at the side of the cam 146 and flush with a solid part of the fork 112 forming a fixed stop. This rockable stop is also recessed so as to be able to pass on either side of the pivot 147.

The selective and reversing actuation mechanism 107 shown in FIGS. 5 and 14 to 19 operates as follows:

To lift a load, i.e., both the support elements 16 and 17, cam 146 is disposed in the position shown in FIGS. 5, 14 and 15. The drive system—irrespective of type—is then started to maintain a reciprocating movement of the support elements. The mechanisms 107 are intended to keep the bottom support element 17 suspended from the posts 11 to 14 during movement of the elements apart and enable the top support element 16 to be lifted and to keep the top support element 16 suspended from the posts 11 to 14 during an approach stroke, and enable the bottom support element 17 to be lifted. It will be seen that all the mechanisms 107 although independent of one another are all controlled by the drive system since the approach or opposite movement stage cannot be initiated until the support element which rises is effectively at the end of its travel (stops 38 and 38a associated with series valves provided for the control of the common distributor). This also applies (see the following) to the lowering of a load.

During a lifting operation, therefore, the various elements of the mechanism 107 react as follows:

First of all, the notches 103 in the post 11 will be distinguished from one another by the references 1, 2, 3, 4, 5 corresponding to the successive lifting levels, 103.1 being the bottom of the series illustrated and 103.5 the highest.

In FIG. 5, the support elements 16 and 17 are at the end of a movement towards one another. The lugs 114 of the top suspension lever 101 are engaged in the notches 103.4 and the lugs 132 of the bottom suspension lever 102 are slightly disengaged from the notches 103.3. The top relay lever 119 applied against the cam 146 is in the operative position so that the engagement spring 118 is tensioned and the disengagement spring 126 is neutralised. On the other hand, the bottom relay lever 138 is free so that the action of the engagement spring 142 is predominant over the action of the disengagement spring 137 and by way of the contact between the surface 145 of this relay lever and the boss 134 of the suspension lever 102, tends to apply the lugs 132 against the post 11. In other words, the relay levers 119 and 138 are in a position such that the lugs 114 and 132 are continually held against the posts resiliently.

During movement away from one another (see FIG. 14), in a first stage the bottom support element 17 descends until the lugs 132 of the bottom suspension lever 102 are completely engaged in the notches 103.3 and in a second stage, while the said bottom element is locked, the top support element 16 lifts. The lugs 114 of the top suspension lever 101 then slide along ascending ramps 105.4 of the edges 104, decsending ramps 106.5 of the post, and penetrate into the notches 103.5 and remain above the bottom thereof. This is the position for the end of the movement of the elements away from one another.

During movement towards one another (see FIG. 15), in a first stage the top support element 16 descends until the lugs 114 of the top suspension lever 101 are completely engaged in the notches 103.5 and in a second stage—while the said top element is locked—the bottom support element 17 lifts. The lugs 132 of the bottom suspension lever 102 then slide along the ascending ramps 105.3, the edges 104, the descending ramps 106.4 and penetrate into the notches 103.4 while remaining above the bottom thereof. This is the end of this stroke (FIG. 5).

Thus during one reciprocation (comprising one stroke in which the elements move apart and one in which they move together), the two-support element assembly has risen one step in complete safety, since the lugs 114 and 132 which initially occupied the notches 103.4 and 103.3 finally occupy the notches 103.5 and 103.4.

To lower a load, cam 146 is placed in the position shown in FIGS. 16 to 19. The drive system is started to maintain a reciprocating movement of the support elements 16 and 17. The mechanisms 107 must then:

Keep the top support element 16 suspended from the posts 11 to 14 during movement of the elements away from one another and enable the bottom support element 17 to be lowered.

Keep the bottom support element 17 suspended from the posts 11 to 14 during the approach stroke and enable the top support element 16 to be lowered.

Thus, during a descent operation the various elements of the mechanism 107 operates as follows:

In FIG. 16, the support elements 16 and 17 are at the end of the approach stroke. The lugs 114 of the top suspension lever 101 are engaged in the notches 103.5 and the lugs 132 of the bottom suspension lever 102 are disengaged from the notches 103.4 and are situated (contrary to FIG. 5 which corresponds thereto as regards the relative position of the support elements 16 and 17 but which differs therefrom as regards the position of the cam 146) outside the post 11. The engagement spring 118 is tensioned and the disengagement spring 126 is neutralised because the top relay lever 119 is locked in the operative position by the curved ramp 153 of the rockable stop 150 which is held in the top position by the fixed stop 112 of the bottom support element 17. On the other hand, the engagement spring 142 is neutralised, since the bottom relay lever 138 is locked in the bottom position by the boss 149 of the cam 146 so that the action of the disengaging spring 137 becomes predominant and as it bears on the relay lever 138 causes the bottom suspension lever 102 to pivot outwards.

In these conditions, during an outward movement stroke (see FIG. 17), the bottom support element 17 descends and under the action of the engagement spring 142 the bottom relay lever 138 pivots upwards, while remaining applied against the cam 146. When the surface 145 of this relay lever 138 meets the projection 134 of the bottom suspension lever 102 the lugs 132 have arrived at a level below that of the descending ramp 106.4 and the spring 142 causes the said lugs to be applied against the edge 104 of the post 11 through the agency of the two levers 138 and 102.

Descent of the bottom support element 17 then continues and the lugs 132 slide along the edges 104 of the ascending ramps 105.3 finally engaging in the notches 103.3. At that moment the bottom support element 17 is locked but the movement of the two elements apart from one another is not completed (FIG. 18).

The rockable stop 150 which at the end of the descent pivoted downwardly because the spring 152 holds it applied against the fixed stop 112 no longer retains the top relay lever 119 which pivots outwards until its plate 121 is stopped by the nose 154 of the rockable stop, which is in turn locked by the stop 155. In this position, the action of the disengagement spring 126 predominates over the action of the engagement spring 118 but the top suspension lever 101 cannot pivot outwards because its lugs 114 are kept engaged in the notches 103.5 by the load.

As soon as the bottom support element 17 is locked, the continuation of the movement of the two elements away from one another has the effect of lifting the top support element 16. Hence the spring 126 whose action has become predominant causes the lugs 114 to be disengaged from the notches 103.5 and the top suspension lever 101 to pivot outwards. This is the end of this stroke.

During an approach stroke, the top support element 16 descends, the lugs 114 of the corresponding suspension lever being disengaged (FIG. 18). The rockable stop 150 encounters the fixed stop 112 which causes the outward pivoting of this rockable stop, which simultaneously causes the relay lever 119 to pivot to its operative position (FIG. 19), in which the action of the engagement spring 118 predominates over the action of the disengagement spring 126. Under these conditions the spring 118 causes the top suspension lever 101 to pivot towards the post 11 to apply the lugs 114 against the edges 104 of the latter. During the descent of the top support element 16, the lugs slide along the edges 104, the ascending ramps 105.4 and engage in the notches 103.4. At that moment the top support element is locked but the approach stroke has not yet been completed.

During the movement of the top support element 16 the boss 149 on the cam 146 meets the bottom relay lever 138 and causes it to pivot downwards. The engagement spring 142 is neutralised and the action of the disengagement spring 137 predominates. However, as long as the lugs 114 are not engaged in the notches 103.4, the lugs 132 cannot be disengaged from the notches 103.3 under the action of the spring 137 urging the bottom suspension lever 102, because of the action of the load.

During the end of the approach stroke, the top support element 16 is stationary and the bottom support element 17 rises. The spring 137 causes the lugs 132 to be disengaged from the notches 103.3. This is the end of the approach stroke.

Thus, during a reciprocating movement (comprising one stroke during which the elements move apart and one stroke in which they move together), the two support element assemblys 16 and 17 is lowered by one step, since the lugs 114 and 132 which initially occupied or were situated opposite the notches 103.5 and 103.4 occupy or are situated finally opposite the notches 103.4 and 103.3.

The repetition of these reciprocating movements thus causes the load to be lifted or lowered according to the position in which the reversing cam is situated.

It may also be advantageous to provide a single system to control all the reversing cams 146 of the equipment simultaneously. An embodiment of this system is shown by way of non-limiting example in FIG. 20.

In this figure, references 65 to 68 denote cranks keyed on shafts 147 of the reversing cams 146 disposed opposite the posts 11–14 respectively. The control system then comprises a longitudinal shaft 69 coupled to the shafts 147 of the cranks 66 and 68 or 65 and 67 and provided with an actuation lever 70. The cranks disposed in the same transverse plane 65 and 66, 67 and 68, are connected to a rocker 71, 72 by sets of links 73 and 74, 75 and 76, the rockers being articulated at their centre on pivots of the top platform 16. The kinematic connection system can of course be of some other kind and, in particular, employ cables.

The invention is not limited to the embodiment illustrated and described in detail, and various modifications may be made thereto without departing from the scope of the invention.

I claim:

1. A lift for motor vehicles and like loads comprising at least two fixed vertical posts, two superimposed support elements adapted to be carried alternately by the posts, a reciprocating drive system which is connected to the support elements with two degrees of freedom, for producing relative vertical displacement of the support elements, clearance guide means for vertically guiding one support element relative to each post and for vertically guiding the other support element relative to the one support element, while permitting limited relative horizontal movement, each of the support elements having a separate retaining means for supporting the support element on each post, separate mechanism for selectively actuating the two retaining means that cooperate with each post, the separate selective actuation mechanisms being independent of each other and of the drive system, a control for each selective actuation mechanism which detects the distance between the support elements in the vicinity of the respective post, and a pair of stops associated with each selective actuation mechanism to limit the relative movement of the support elements in both directions, the stops for all the selective actuation mechanisms being connected to control the reversal of the reciprocating drive system.

2. A lift according to claim 1 wherein each post is provided with regularly spaced successive points of support, the relative vertical movement of the support elements, as limited by the stops, being slightly greater than the spacing between the successive points of support, the minimum distance between the support elements being less than such spacing, and the maximum than such spacing.

3. A lift according to claim 1 wherein each post is provided with regularly spaced successive points of support, the retaining means for supporting the support elements on each post consisting of retractable floating suspension means cooperating with such points of support.

4. A lift according to claim 3 wherein the points of support on the posts consist of notches, and each suspension means comprises a substantially vertical suspension lever the lower end of which has a hinge connection to a support element and the upper end of which is provided with a projecting lug extending parallel to the hinge connection for cooperating with the notches.

5. A lift according to claim 4 wherein each post is constituted by a U-section having side flanges between which the suspension levers are arranged, and the notches are cut in the free edges of the side flanges, each notch having a semi-circular shape and being connected to the free edge of the flange by an ascending ramp and a descending ramp.

6. A lift according to claim 1 wherein each retaining means comprises a retractable pivoted suspension lever, and each mechanism for selectively actuating two retaining means comprises for each suspension lever two counter-acting springs, and a relay lever pivoted on the same axis as the suspension lever, one of the springs being borne by the relay lever and the other spring being borne by the associated support element, the control for each selective actuation mechanism comprising a two-position reversing cam pivoted on one of the support elements, and a rockable stop which is pivoted on the same support element and is operated by the other support element.

7. A lift according to claim 6 wherein each spring that is borne by a support element acts through the relay lever upon the associated suspension lever.

8. A lift according to claim 7 wherein each two-position reversing cam is pivoted on the upper support element, and in its load lifting position holds the associated relay lever to load the spring borne by such lever, and in its load lowering position contacts the relay lever associated with the lower support element to load the spring borne by such lever whenever the two support elements approach one another.

9. A lift according to claim 6 wherein each rockable stop is pivoted on the upper support element, and is actuated by a fixed stop on the lower support element, when the associated two-position reversing cam is in its load lowering position, to hold the upper relay lever so as to load the spring borne by such lever until the two support elements approach one another.

10. A lift according to claim 9 wherein the reversing cams of all the selective actuation mechanisms are controlled by a common control system.

11. A lift according to claim 1 wherein the reciprocating drive system is of the pneumatic type, and comprises a plurality of pneumatic valves arranged in series for controlling movement of the support element toward one another, one being located adjacent each of the stops which limit movement of the support elements away from one another, and a plurality of pneumatic valves arranged in series for controlling movement of the support elements away from one another, one being located adjacent each of the stops which limit movement of the support elements toward one another.

12. A lift according to claim 1 wherein the reciprocating drive system comprises a plurality of hydraulic jacks distributed between the support elements and connected in parallel to a cylinder for supplying fluid under pressure, the capacity of such cylinder being equal to the sum of the capacities of the hydraulic jackes corresponding to the travel determined by the limiting stops.

13. A lift according to claim 11 wherein the reciprocating drive system comprises at least one pneumatically inflatable tubular envelope interposed between the support elements, and means for returning the support elements toward one another.

14. A lift according to claim 13 wherein the means for returning the support elements toward one another comprises a compression spring associated with each post which is located above the upper support element and below an extension connected to the lower support element.

15. A lift according to claim 13 wherein the means for returning the support elements toward one another comprises at least one pneumatically inflatable tubular envelope.

References Cited by the Examiner
UNITED STATES PATENTS

| | | |
|---|---|---|
| 2,610,824 | 9/1952 | Grier. |
| 2,804,118 | 8/1957 | Bayerkohler. |
| 2,846,275 | 8/1958 | Esch _____ 254—105 |
| 3,028,143 | 4/1962 | Cheskin _____ 254—105 |

SAMUEL F. COLEMAN, *Primary Examiner.*

ANDRES H. NIELSEN, *Examiner.*